Patented June 24, 1924.

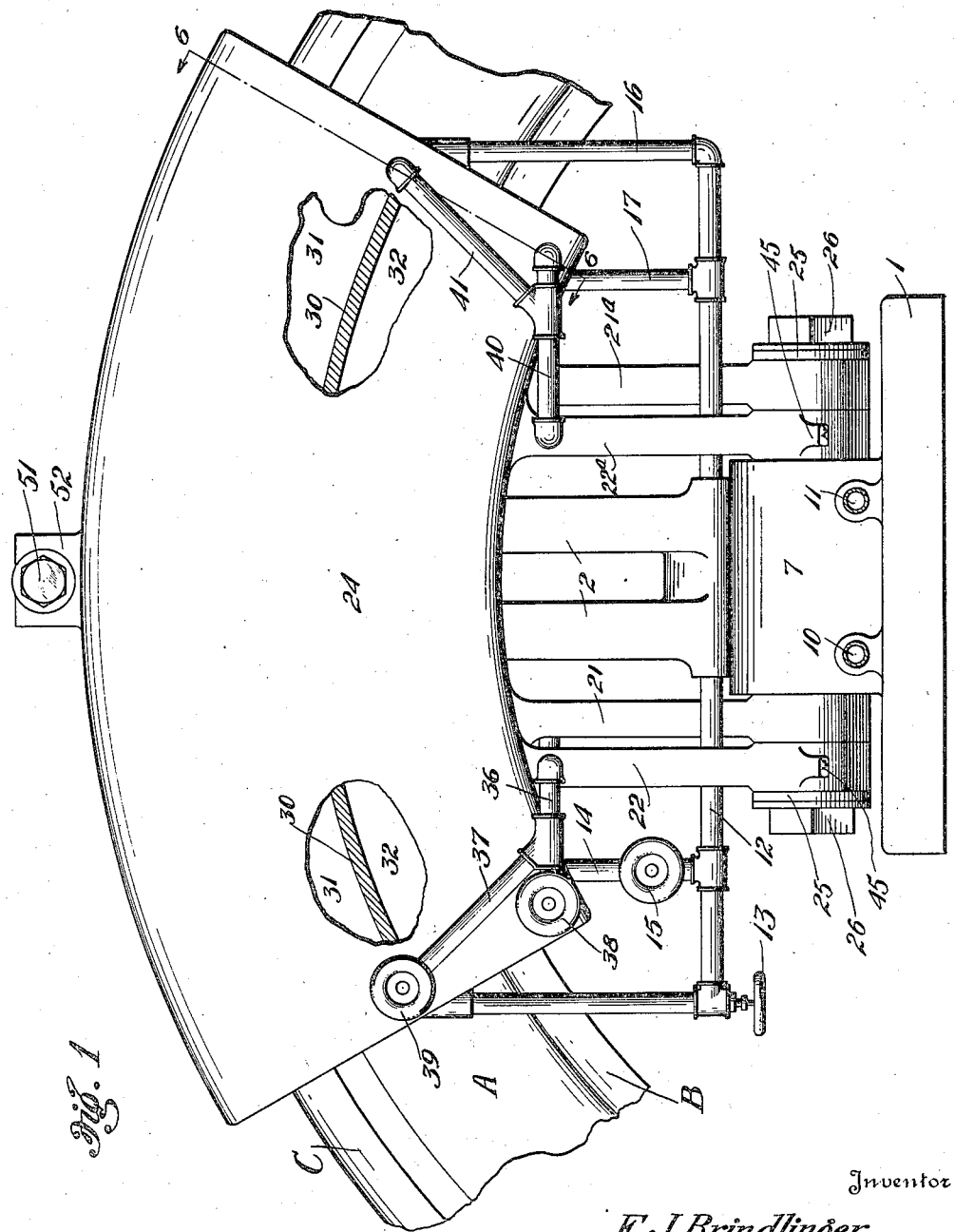

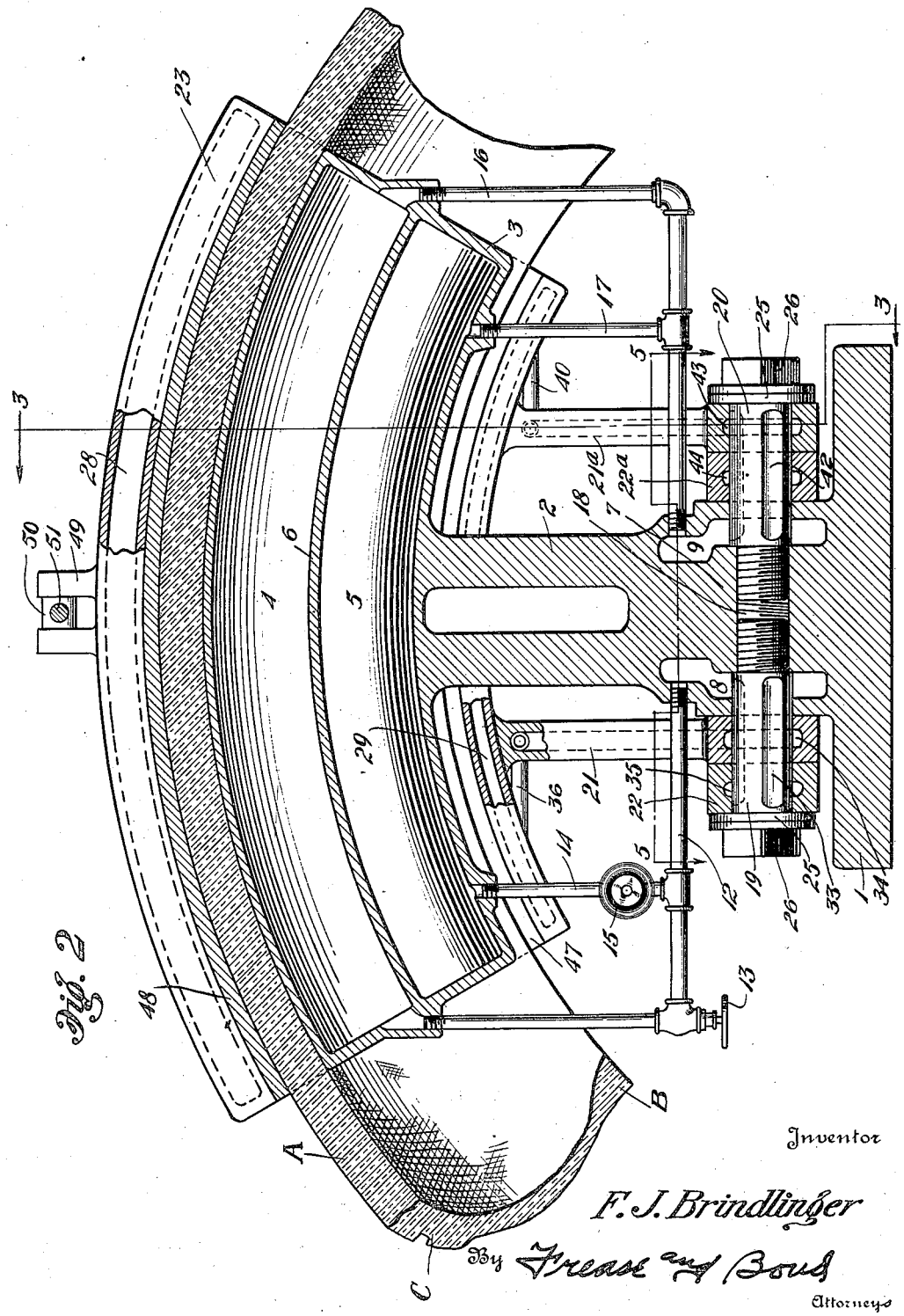

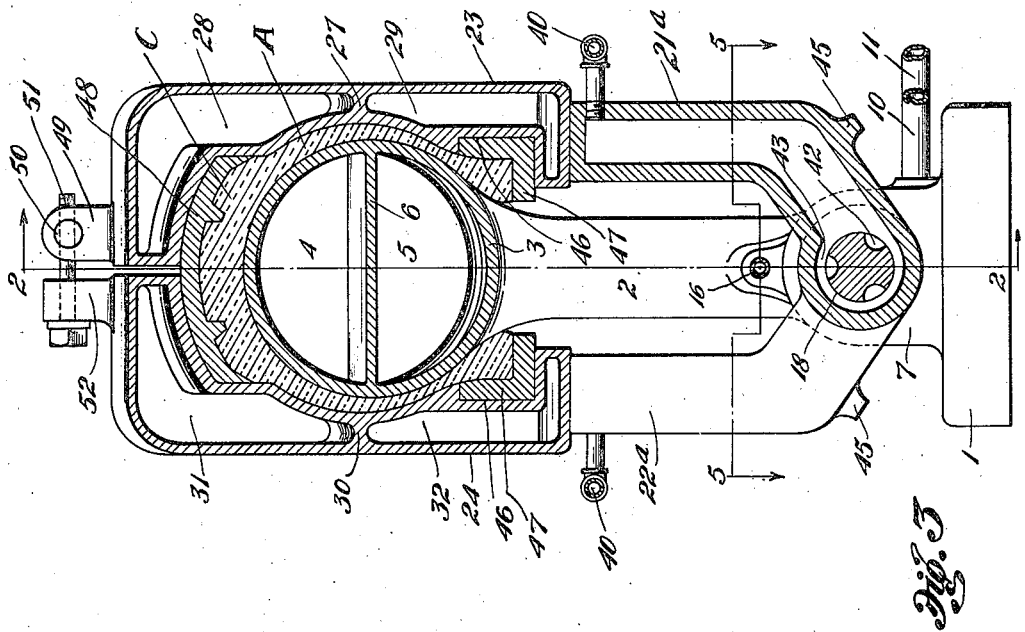

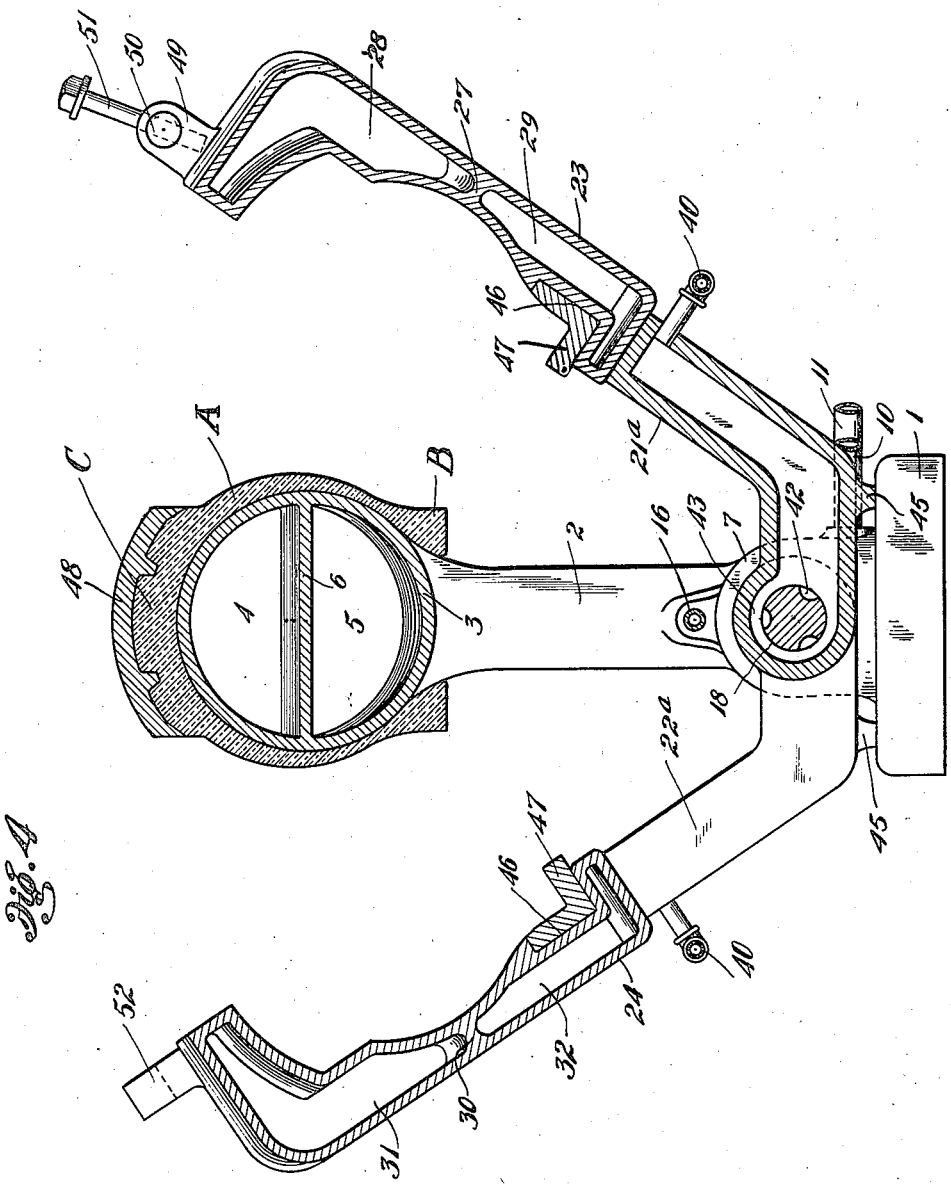

1,498,998

UNITED STATES PATENT OFFICE.

FRANK J. BRINDLINGER, OF CANTON, OHIO, ASSIGNOR OF ONE-THIRD TO CHARLES E. MILLER AND ONE-THIRD TO OLIVER G. ZIEGLER, BOTH OF CANTON, OHIO.

TIRE-REPAIRING VULCANIZER.

Application filed June 28, 1922. Serial No. 571,467.

*To all whom it may concern:*

Be it known that I, FRANK J. BRINDLINGER, a citizen of the United States, residing at Canton, in the county of Stark and State of Ohio, have invented certain new and useful Improvements in Tire-Repairing Vulcanizers, of which the following is a specification.

The invention relates to a tire repairing vulcanizer for use in repairing tire casings which have been damaged by blow outs or the like.

With the usual repair vulcanizers such as are in common use, it is not possible to localize the heat at any particular point in the section of the tire being repaired, it being necessary because of the construction of the vulcanizer to heat the entire section being repaired to the vulcanizing temperature, thus causing a deterioration of a portion of the tire by unnecessary heating of the same.

Repair vulcanizers of this general type usually comprise a device arranged to be clamped upon the portion of the tire casing while the same is being repaired.

The objects of the present invention are to provide a repair vulcanizer having a stationary core section upon which the tire casing is supported and hinged mold sections mounted upon the stationary base supporting the core section, and arranged to be clamped upon the tire casing, a removable tread section and removable bead sections being clamped within the mold sections, these tread and bead sections being interchangeable to accommodate different designs of tire casings; each of the core and mold sections being divided by partitions into upper and lower chambers or compartments, means being provided for admitting steam to each of said compartments independently of the others, a steam outlet being provided in each compartment.

With a repair vulcanizer of the construction above generally described, the tire casing to be repaired is supported upon the stationary core, the portion of the casing to be repaired being positioned properly upon the core. The proper tread section is then placed upon the tread of the casing and bead sections conforming to the contour of the beads of the casing are placed in position in the mold sections, which are then clamped upon the casing and steam is admitted to the desired compartments of the core and mold sections to vulcanize the damaged portion of the tire casing.

An embodiment of the invention thus set forth in general terms is illustrated in the accompanying drawings, in which—

Figure 1 is a side elevation of a repair vulcanizer embodying the invention, showing a portion of a tire casing mounted therein;

Fig. 2, a longitudinal sectional view through the same on the line 2—2, Fig. 3;

Fig. 3, a transverse section on the line 3—3, Fig. 2;

Fig. 4, a section similar to Fig. 3 showing the mold sections in the open position;

Fig. 5, a section on the line 5—5, Figs. 2 and 3; and

Fig. 6, a transverse section through one of the mold sections on the line 6—6, Fig. 1.

Similar numerals refer to similar parts throughout the drawings.

Referring to the construction illustrated in the accompanying drawings, a base plate 1 is provided to be mounted upon any suitable stationary support and the standard 2 is fixed thereon and supports the hollow arcuate core section 3, which is divided into the upper and lower compartments 4 and 5 respectively, by means of the partition 6.

The base 1 is provided with a dome 7 having a steam inlet chamber 8 and a similar outlet chamber 9 formed therein, a steam line 10 communicating with the inlet chamber and an exhaust pipe 11 communicating with the outlet chamber.

A pipe 12 communicates with the upper end portion of the steam inlet chamber 8 and leads to the upper compartments 4 of the core section, a valve 13 being provided in said pipe for controlling the flow of steam to the compartment 4. A branch pipe 14 leads from the pipe 12 to the lower compartment 5 of the core section and is provided with a valve 15 for controlling the supply of steam to the compartment 5. An exhaust pipe 16 leads from the upper compartment 4 of the core to the steam outlet chamber 9 and a pipe 17 connects the lower compartment 5 with the pipe 16.

The dome 7 is provided with a longitudinal threaded bore 18 into which the threaded extremities of the arbors 19 and 20 are extended. The hollow arms 21—21ᵃ and 22—22ᵃ of the hinged mold sections 23 and 24 respectively, are journaled upon the arbors 19 and 20. A gasket 25 is interposed between the head 26 of each arbor and the adjacent arm 21 or 22 in order to form a steam tight joint.

The mold section 23 is divided by means of a central partition 27 into the upper and lower compartments 28 and 29 respectively and the mold section 24 is similarly divided by means of a partition 30 into the upper and lower compartments 31 and 32 respectively.

The arbor 19 is provided with longitudinal grooves 33 which provide communication between the steam chamber 8 and the annular pockets 34 and 35 in the adjacent hollow arms 21 and 22. A pipe 36 connects the hollow arm 22 with the lower compartment 32 of the mold section 24, a branch pipe 37 connecting the pipe 36 to the upper compartment 31 thereof. Valves 38 and 39 respectively are located in said pipes to control the flow of steam to the compartments 32 and 31. The hollow arm 21 is connected in the same manner to the compartments 28 and 29 of the mold section 23.

The lower compartment 32 is connected by means of an exhaust pipe 40 with the hollow arm $22^a$, a branch pipe 41 connecting the upper compartment 31 with the pipe 40. The arbor 20 is provided with longitudinal grooves 42 which provide communication between the exhaust chamber 9 and the annular pockets 43 and 44 in the hollow arms $21^a$ and $22^a$ respectively. The hollow arm $21^a$ is connected to the upper and lower compartments 28 and 29 of the mold section 23 by exhaust pipes similar to the pipes 40 and 41 above described.

Each of the hollow arms $21-21^a$ and $22-22^a$ is provided with a stop lug 45 arranged to engage the base when the arms are in the open position as shown in Fig. 4. The inner contour of each of the mold sections 23 and 24 corresponds to the outer contour of the tire casing A and each mold section is provided on its inner face with a recess 46, adapted to receive a removable bead strip 47 of a proper shape to conform to the bead B of the tire.

A tread section 48, having a face conforming to the tread C of the tire casing, is provided to be clamped upon the tread of the casing when the mold sections are clamped together as shown in Fig. 3.

For the purpose of clamping the mold sections together, one of the sections is provided with a lug 49 in which is swivelled a pin 50, a screw 51 being threaded therethrough, the head thereof being arranged to engage the bifurcated lug 52 upon the other mold section.

The operation of the device is as follows; the mold sections being in the open position as shown in Fig. 4, the tire casing is placed over the stationary core section as shown in said figure, the damaged portion of the casing being placed upon the core. The rubber is applied to the damaged portion of the casing in the usual manner and the tread section is then placed in position upon the tread of the casing.

The bead strips are placed in the mold sections which are then closed and clamped together upon the casing as shown in Fig. 3. Steam is then admitted to any desired number of the compartments in the core and mold sections, applying the heat to the portion of the tire to be vulcanized.

It will be evident from the above that a repair vulcanizer is provided upon which the tire casing to be repaired may be easily mounted and supported and in which the heat may be localized at any desired point upon the tire casing, while the remaining parts of the casing are not unnecessarily subjected to the extreme heat which causes deterioration of the casing.

I claim:—

1. A vulcanizer for vulcanizing a portion of a tire including a stationary core section adapted to enter a portion of a tire to be vulcanized and a pair of hinged mold sections adapted to entirely enclose the portion of the tire to be vulcanized.

2. A vulcanizer for vulcanizing a portion of a tire including a stationary core adapted to enter a portion of a tire to be vulcanized and a pair of mold sections hingedly connected to the core section and adapted to entirely enclose the portion of the tire to be vulcanized.

3. A vulcanizer for vulcanizing a portion of a tire including a base, a core section fixedly connected to the base and adapted to enter a portion of a tire to be vulcanized and a pair of mold sections movably connected to the base and adapted to entirely enclose the portion of the tire to be vulcanized.

4. A vulcanizer for vulcanizing a portion of a tire including a base, an upright thereon, a core section fixed upon the upright and adapted to enter a portion of a tire to be vulcanized, a pair of arms hinged to the base, and a mold section carried by each arm, said mold sections being adapted to entirely enclose the portion of the tire to be vulcanized.

5. A vulcanizer for vulcanizing a portion of a tire including a base, a core section fixedly connected to the base, and adapted to enter a portion of a tire to be vulcanized, hollow arms hinged to the base, hollow mold sections carried by the arms and means for admitting steam to said hollow arms, said mold sections being adapted to entirely enclose the portion of the tire to be vulcanized.

6. A vulcanizer for vulcanizing a portion of a tire including a stationary hollow core section divided into compartments, a pair of hinged hollow mold sections divided into compartments and means for admitting steam to any desired combination of said compartments.

7. A vulcanizer for vulcanizing a portion of a tire including a stationary hollow core section arranged to receive a portion of a tire casing to be vulcanized, a pair of hinged hollow mold sections arranged to be closed around the exterior of the portion to be vulcanized of the tire casing and means for admitting steam to the core and mold sections to heat the inner and outer surfaces of the portion of the tire casing to be vulcanized.

FRANK J. BRINDLINGER.